United States Patent [19]

Takatori

[11] Patent Number: 5,153,875
[45] Date of Patent: Oct. 6, 1992

[54] ADAPTIVE BALANCING NETWORK

[75] Inventor: Hiroshi Takatori, Sacramento, Calif.

[73] Assignee: Level One Communications, Inc., Folsom, Calif.

[21] Appl. No.: 674,685

[22] Filed: Mar. 25, 1991

[51] Int. Cl.⁵ .............................................. H04M 9/08
[52] U.S. Cl. ................................. 370/32.1; 379/410; 379/406; 379/390
[58] Field of Search ................... 370/32.1, 32, 29, 24; 381/108; 379/410, 407, 411, 408, 406, 409, 345, 343, 347, 390; 375/8, 97, 98, 99, 14

[56] References Cited

U.S. PATENT DOCUMENTS

| 4,564,934 | 1/1986 | Macchi | 370/32.1 |
|---|---|---|---|
| 4,757,527 | 7/1988 | Beniston et al. | 370/32.1 |
| 4,845,746 | 7/1989 | Li | 379/411 |
| 4,896,318 | 1/1990 | Kokubo et al. | 370/32.1 |
| 4,922,530 | 5/1990 | Kenney et al. | 379/411 |
| 4,928,308 | 5/1990 | Roessler | 370/32.1 |
| 4,937,813 | 6/1990 | Schenk | 370/32.1 |
| 4,987,569 | 1/1991 | Ling et al. | 370/410 |
| 4,991,167 | 2/1991 | Petri et al. | 379/410 |
| 5,007,047 | 4/1991 | Sridhar et al. | 379/410 |

Primary Examiner—Benedict V. Safourek
Assistant Examiner—Dang T. Ton
Attorney, Agent, or Firm—Merchant, Gould, Smith, Edell, Welter & Schmidt

[57] ABSTRACT

An adaptive balancing network apparatus provides improved cancellation of transhybrid response. The adaptive balancing network removes near-end echo much better than the prior art methods over a wide variation of the loop plant, and hence, provides a cost-effective implementation of a transceiver. The apparatus comprises two adaptive balancing networks and a balancing network filter that provides increased echo cancellation in the analog domain of up to 25 dB, so that the signal can be amplified before the A/D and D/A conversion by about 20 dB more than it could be by a simple divider balancing network. Therefore, the requirements for A/D and D/A convertors can be relaxed from 13 bits to 10 bits (or less). The first adaptive balancing network removes a first portion of the echo using a transmitted signal. The balancing network filter reshapes the transmitted signal and shifts it in time so that the second adaptive balancing network can cancel a second portion of the echo. Control of the adaptive balancing networks is accomplished by monitoring the coefficients of an echo canceller in the digital domain during an initial convergence time period; thereafter the balancing networks are frozen until their next initialization.

9 Claims, 5 Drawing Sheets

ADAPTIVE BALANCING NETWORK

BACKGROUND OF THE INVENTION

1. Field of the Invention

The present invention relates generally to the field of electronic filters. In particular, the present invention relates to an adaptive balancing network apparatus that provides improved echo cancellation of a transhybrid response.

2. Description of Related Art

Using the existing telephone system as a communication channel for the additional services involves more than just connecting a machine to a phone line. For example, the existing phone system was only designed to transmit analog signals with a bandwidth of about 300–3500 hertz, which is sufficient for voice communication, but not optimum for the additional services which generally transmit data having significantly higher frequency components. The result is that the signals of the additional services distort as they propagate.

Aggravating the problem of using the present system is the fact that only a single twisted pair of wires interconnect a subscriber (user) with a central office. This means that the subscriber's transmitter (mouthpiece) and receiver (earpiece) share the same two wires. While this is a low cost method of connecting subscribers to a central office, because full duplex (simultaneous two-way) operation is desired cancellation of a subscriber's transmission from his own receiver is required.

The function of a receiver is to detect pulses being sent from the far end of the communication channel. Since the communication channel is only a two wire cable, transmit and receive pulses can be contemporaneous on the channel causing an echoing effect when the two interact. The echoing effect can be removed by an echo canceller using a replication or a portion thereof of the transmitted pulse and subtracting it from the received pulse, such as described in the co-pending and commonly assigned U.S. patent applications Ser. No. 07/507,593, entitled "IMPROVED TRANSVERSAL FILTER ECHO CANCELLER," filed Apr. 10, 1990, by Kenneth G. Buttle, and Ser. No. 07/507,595, entitled "NONLINEAR ECHO CANCELLER", filed Apr. 10, 1990, by Kenneth G. Buttle et. al., both of which applications are incorporated by reference herein.

This is understood by considering that if a first and second subscriber both transmit at the same time, the second subscriber's signal attenuates as it travels toward the first subscriber. If the first subscriber does not cancel out of his receiver his own transmission he will hear only his own transmission and not the desired, attenuated second subscriber's signal.

Full duplex operation on two wires therefore requires that a transmitted signal must be reduced sufficiently from the transmitter's own receiver to allow reception of an incoming signal. While readily accomplishable with voice communication, it is much harder to do with the additional services because those services are more sensitive to incompletely cancelled signals.

Exacerbating the problem of increased sensitivity to incompletely cancelled signals are the numerous wire taps, wire gauge changes, and switching networks which cause signal "reflections" in the present phone system. These reflections can be picked up by the transmitter's receiver and, if not handled properly, could be mistaken for a signal from another subscriber.

Even further complicating the use of the present phone system as a communication medium is that the present phone lines have widely variable transmission line characteristics. This creates a problem because any mismatch between the telephone line and the service using the phone line causes an "incident" signal that is reflected into the receiver.

The effects of insufficient echo cancellation, line taps, mismatches, and high frequency are more serious when using the additional services than with just voice communications. To assist in reducing these and other problems, the Accredited Standards Committee on Telecommunications, T1, submitted to the American National Standards Institute a standard for integrated services digital networking, ANSI T.601-1988, entitled "Integrated Services Digital Network (ISDN)—Basic Access Interface for Use on Metallic Loops for Application on the Network Side of the NT (Layer 1 Specification)." This document describes a minimal set of requirements and protocols for satisfactory communication between subscribers when using the additional services with full duplex operation on the existing single twisted wire pair phone line.

The ANSI T1.601-1988 specification defines "basic access" as a standardized combination of access channels that constitute the access arrangement for the majority of ISDN users. Specifically it includes any of the following combinations of access channels:

a) one D-Channel
b) one B-Channel
c) two B-Channels & one D-Channel where a B-channel is a 64 kilobits per second (kps) channel that carries customer information, such as voice calls, circuit switch data, or packet switch data; a D-channel is an access channel carrying control or signaling information and optionally packetized information and telemetry. The D-channel has a capacity of 16 kps. Accordingly, the data rate transfer sum of two B-channels and one D-channel is equal to 144 kps. Problems arise on these high speed channels since data is transceived over a telephone voice communication channel having a narrow bandwidth and line insertion losses of 40 to 50 dB.

As previously indicated, for acceptable full duplex operation when using the existing single twisted pair phone lines with the additional services, the transmitted information must be more fully cancelled despite the increased reflections and the incident signal. By adding together both the reflections and the incident signal, one obtains the "transhybrid response."

A signal transmitted on a phone line may become attenuated by as much as 40 dB (100 times), making a 5/6 volt transmit signal only about 0.0083 volts at the receiver. Since an echo may be almost as large as a transmit signal, or up to about 2.5 volts, a receiver may be required to detect a 0.0083 volt signal riding on a 2.5 volt echo. Reduction of the echo amplitude to an acceptable amount is the job of the echo canceller.

While the echo canceller must reduce the echo to an acceptable amount (roughly a 67 dB reduction), the actual transhybrid response is unknown until the lines connecting the subscribers are established, something that does not occur until a call is answered. Therefore, acceptable methods of echo cancelling must be adaptive, i.e., they must adjust to the line conditions existing at the time of the call.

Usually, a total echo canceller consists of a balancing network and an adaptive echo canceller. Typically, the adaptive echo canceller is a transversal filter implemented with digital circuits which eliminates the transhybrid response by adjusting its output to cancel the response. The balancing network, which is usually a simple fixed divider, is typically implemented with analog circuits.

Therefore, one way to implement a total echo canceller is to convert analog signals output from the balancing network to digital signals so that the transversal filter can cancel a residual echo in a digital domain. Another way to implement a total echo canceller is to convert digital signals output from the transversal filter to analog signals so that the balancing network can cancel a residual echo in an analog domain. In either case, the key issue is the accuracy requirement of the A/D or D/A convertors, because the achievable transhybrid cancellation with a balancing network implemented by a simple divider is only 6 dB due to gage differences, bridged-tap connections, etc. The accuracy requirement for the A/D or D/A convertors is 13 bits or more, if the balancing network is implemented by a simple fixed divider. However, such accuracy in A/D and D/A convertors cannot be easily achieved in a cost-effective manner using current IC fabrication techniques. The present invention eliminates this problem using an adaptive balancing network which amplifies the signal before the A/D or D/A conversion.

SUMMARY OF THE INVENTION

To overcome the limitations in the prior art described above, and to overcome other limitations that will become apparent upon reading and understanding the present specification, the present invention discloses an adaptive balancing network apparatus and a method of using that apparatus to achieve improved cancellation of transhybrid response. The present invention removes near-end echo much better than the prior art methods over a wide variation of the loop plant, and hence, provides a cost-effective implementation of a transceiver.

The present invention comprises two adaptive balancing networks and a balancing network filter that provide increased echo cancellation in the analog domain of up to 25 dB, so that the signal can be amplified before the A/D or D/A conversion by about 20 dB more than it could be by a simple divider balancing network. Therefore, the requirements for A/D and D/A convertors can be relaxed from 13 bits to 10 bits (or less).

The first adaptive balancing network removes a first portion of the echo using a transmitted signal. The balancing network filter reshapes the transmitted signal and shifts it in time so that the second adaptive balancing network can cancel a second portion of the echo. Control of the adaptive balancing networks is accomplished by monitoring the tap outputs of an echo canceller in the digital domain during an initial convergence time period; thereafter the balancing networks are frozen until their next initialization.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides an adaptive balancing network that removes near-end echo much better than the prior art methods over a wide variation of the loop plant, and hence, provides a cost-effective integrated circuit (IC) implementation of a high performance transmitter/receiver (transceiver) for a bidirectional data transmission systems on twisted pair cable, such as the Digital Subscriber Loop (DSL) system for Integrated Service Digital Network (ISDN) basic access carrying 144 kps using conventional telephone twisted-pair cable. The Applicant found from experimentation on actual telephone lines and from software simulation that using selected tap outputs from a transversal filter echo canceller to control the selection of a capacitive load provided by an adaptive balancing network can increase echo cancellation by 25 dB or more.

Figure 1:
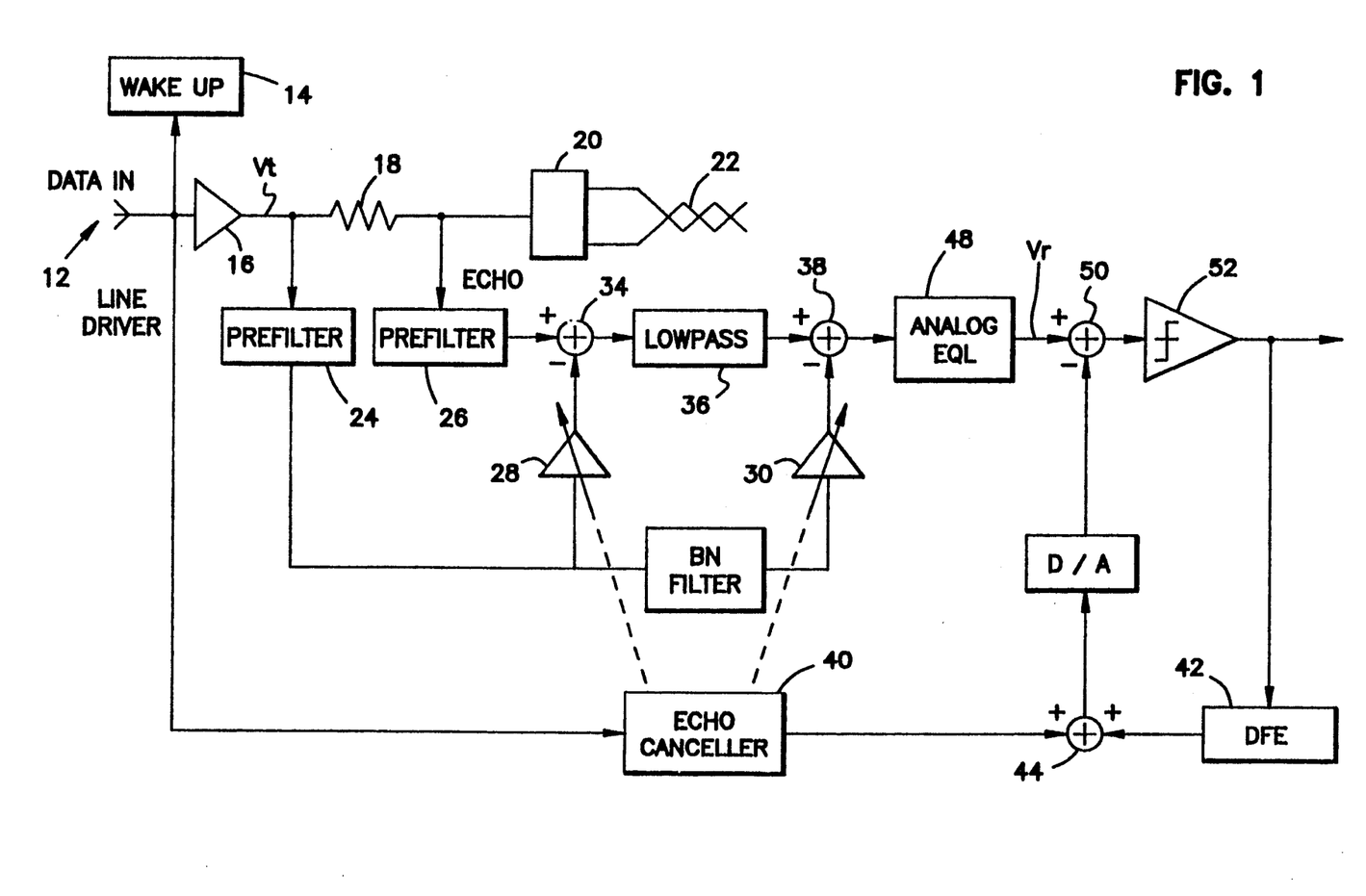
FIG. 1 is a block diagram of the transceiver of the present invention.

FIG. 1 illustrates a transceiver 10, which comprises bus 12, wake up circuit 14, line driver 16, impedance network 18, transformer 20 for isolating and coupling the transceiver 10 to twisted pair cable 22, prefilters 24 and 26, an adaptive balancing network comprising first adaptive balancing network (ABN1) 28, second adaptive balancing network (ABN2) 30 and balancing network filter (BN filter) 32, summing node 34, low-pass filter 36, summing node 38, echo canceller 40, decision feedback equalizer 42, summing node 44, digital-to-analog (D/A) converter 46, analog phase equalizer 48, summing node 50, and comparator 52 which quantizes its analog input into a digital signal.

To assist understanding the principles of the present invention, the operation of the transceiver 10 will be described immediately after a communication link between two subscribers has been implemented, at which time wake up circuit 14 applies a predetermined digital pattern of two digital bits according to ANSI T1.601-1988 protocol specifications to bus 12, which contains a line for each of the digital bits used. The predetermined digital pattern is applied via bus 12 to echo canceller 40, so that the echo canceller 40 can "learn" the characteristics of the phone line 22. The predetermined digital pattern is also applied via bus 12 to line driver 16.

Line driver 16 is a D/A converter which converts the digital pattern to an analog transmit signal corresponding to the specifications of ANSI T1.601-1988. The output of the line driver 16 is coupled to prefilter 24 and to the transformer 20 through resistor 18.

Resistor 18 ideally has an ohmic value equal to the reflected line impedance of transformer 20 so that maximum power is transferred to twisted-pair cable 22. Assuming the impedance is substantially equal to the reflected line impedance, the voltage at prefilter 26 is substantially one-half the voltage at prefilter 24 when no signals are impressed on twisted-pair cable 22.

Data reception occurs by receiving a signal that is impressed from a remote location onto the twisted pair cable 22. The received signal is isolated and coupled to prefilter 26 through transformer 20. Since the other subscriber is not transmitting until the echo cancellation is completed, the only signal on twisted-pair cable 22 and received by the prefilter 26 is the signal from line driver 16 combined with the undesired echo components.

Prefilters 24 and 26 are low pass filters that provide an output substantially free of high frequency components. Prefilter 26 outputs the combined transmit signal and echo to summing node 34. Prefilter 24 outputs the transmit signal to BN filter 32 and ABN1 28.

ABN1 28 provides a flat frequency DC voltage gain to the output of prefilter 26. The control for ABN1 28 is provided by the 3rd tap output from echo canceller 40, which is the result of multiplying the data in the 3rd prior baud period by a gain factor; the resultant product equals the transhybrid response caused by the data. Experimentation by the Applicant on actual telephone lines and from software simulation indicates that ABN1 28 provides the best response when aligned to the 3rd tap of echo cnaceller 40.

The output from ABN1 28 is subtracted from the output of prefilter 26 at summing node 34, thereby cancelling a first portion o the echo component. Summing node 34 outputs the resultant signal to low pass filter 36. Low pass filter 36 provides an output substantially free of high frequency components and shifted in time.

BN filter 32 is also a low pass filter which reshapes and shifts in time the output from prefilter 24. BN filter 32 must have a certain delay from input to output to align the transmitted signal with the output of low pass filter 36. The frequency response of the BN filter 32 must account for the different waveforms of the transmitted signal created by differences in various loop plants. BN filter 32 outputs the resultant signal to ABN2 30.

ABN2 30 provides a flat frequency DC voltage gain for the output of BN filter 32. The control for ABN2 30 is provided by the 4th tap output form echo canceller 40, which is the result of multiplying the data in the 4th prior baud period by again factor. The resultant product equals the transhybrid response caused by the transmitted signal. Experimentation by the Applicant on actual telephone lines and from software simulation indicates that ABN2 30 provides the best response when aligned to the 4th tap of echo canceller 40.

The output from ABN2 30 is subtracted from the output of low pass filter 36 at summing node 38, thereby cancelling a second portion of the echo component. Summing node 38 outputs the resultant signal to analog equalizer 48.

Analog equalizer 48 is preferably a phase equalizer of the type described the co-pending and commonly assigned patent application Ser. No. 07/596,220, entitled "A CIRCUIT AND METHOD FOR REDUCING PRECURSOR INTERSYMBOL INTERFERENCE IN A BI-DIRECTIONAL DATA COMMUNICATION SYSTEM", filed Oct. 12, 1990, by Applicant Hiroshi Takatori, which application is incorporated by reference herein. Equalizer 48 provides the functions of sample and hold, automatic gain control, precursor filtering and tail filtering. The output of equalizer 48 is coupled to summing node 50.

The output of summing node 50 is coupled to comparator 52 which quantizes the analog signal into a digital signal suitable for digital processing. The output of comparator 52 is also coupled to decision feedback equalizer 42.

Decision feedback equalizer 42 is preferably of the type described the co-pending and commonly assigned patent application Ser. No. 07/605,735, entitled "ADAPTIVE CONVERGENT DECISION FEEDBACK EQUALIZER", filed Oct. 30, 1990, by Applicant Kenneth G. Buttle, which application is incorporated by reference herein. The output of decision feedback equalizer 42 is digitally combined in a subtractive relation with the output of echo canceller 40 at summing node 44 for postcursor intersymbol interference reduction.

The output of summing node 44 is coupled to D/A converter 46 for conversion of the digital signal into an analog signal. The output of D/A converter 46 is coupled in a subtractive relation with the output of equalizer 48 at summing node 50.

Figure 2A:
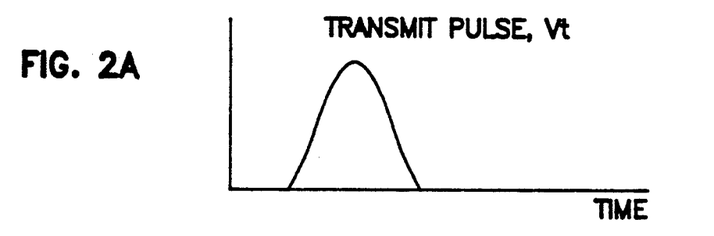
FIGS. 2A-2E illustrate the waveforms at various points in the transceiver.
Figure 2B:
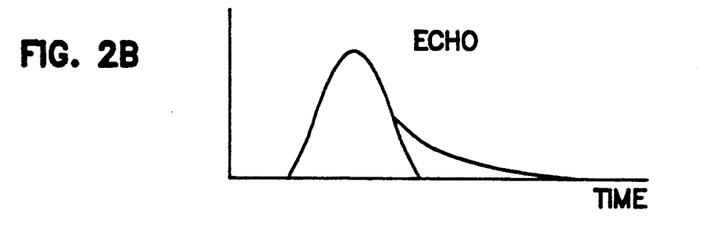
Figure 2C:
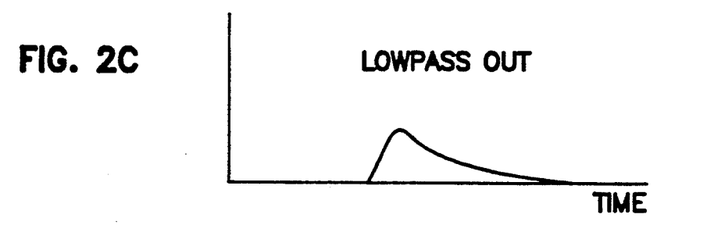
Figure 2D:
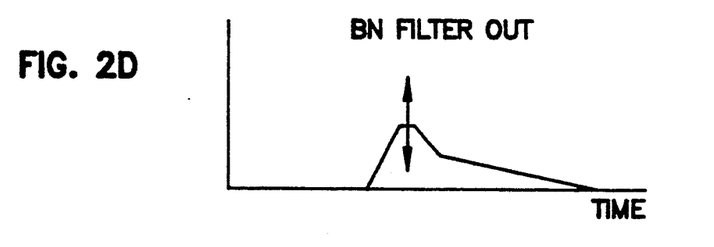
Figure 2E:
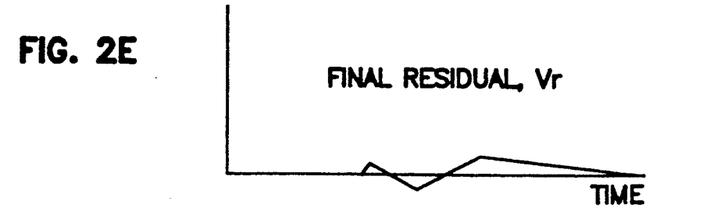

FIGS. 2A-2E illustrate the echo cancellation performed by the present invention. FIG. 2A shows the waveform of the output of line driver 16; FIG. 2B shows the waveform of the echo input to prefilter 26; FIG. 2C shows the waveform of the output of low pass filter 36; FIG. 2D shows the waveform of the output of BN filter 32; and FIG. 2E shows the waveform of the output of analog equalizer 48, i.e., the echo residual.

Figure 3:
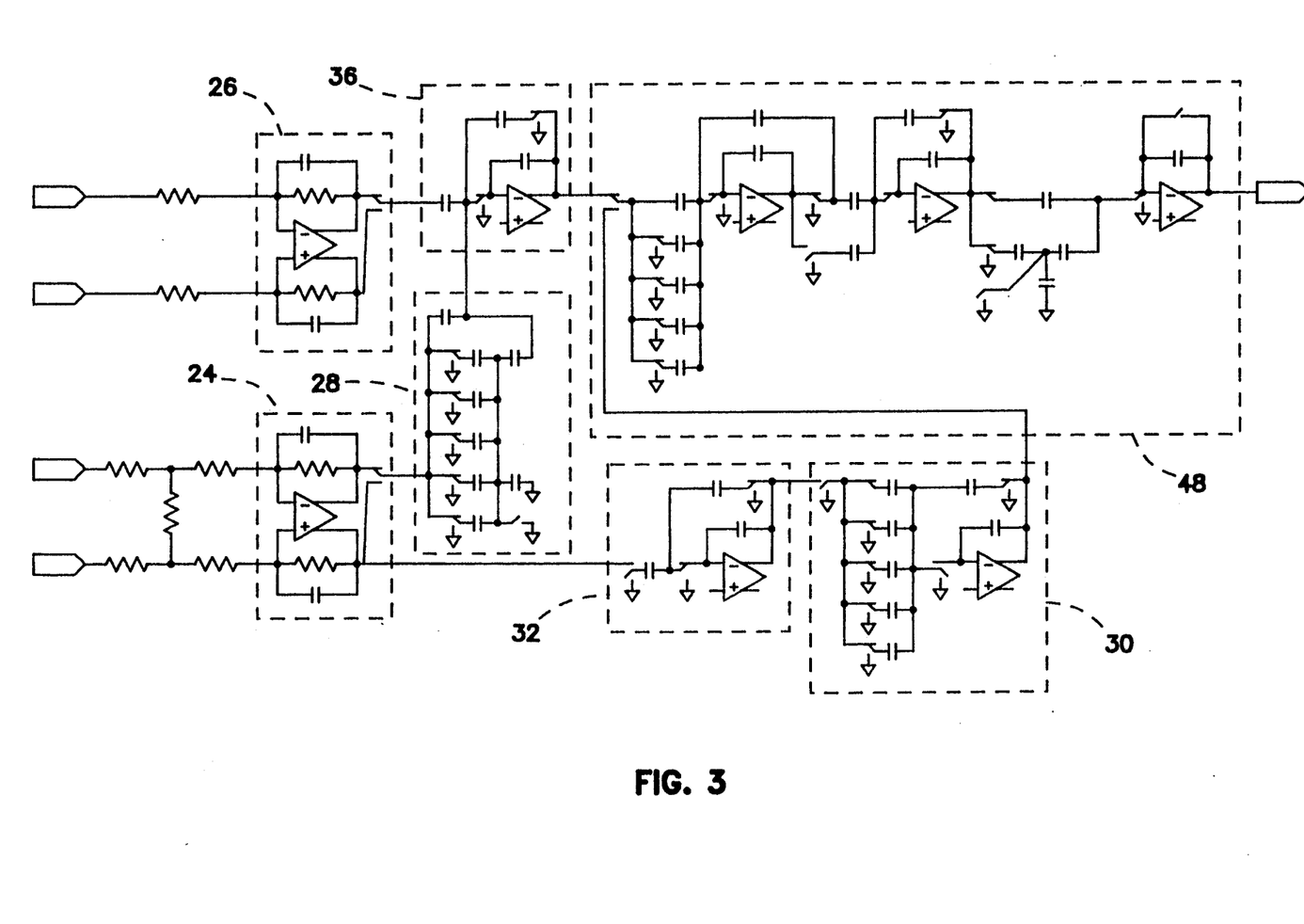
FIG. 3 is a schematic diagram of the analog portions of the transceiver of FIG. 1.

FIG. 3 illustrates the analog components used in the transceiver 10, including prefilter 24, prefilter 26, ABN1 28, ABN2 30, BN filter 32, summing nodes 34 and 38, low-pass filter 36, and analog equalizer 48.

BN filter 32 is a low pass filter which reshapes and shifts in time the output from prefilter 24. There are two key design issues for the BN filter 32, i.e., delay and frequency response (wave reshaping). The frequency response of the BN filter 32 must account for the different waveforms output by low pass filter 36, which waveforms differ according to differences in various loop plants. To accommodate these different waveforms, BN filter 32 has two poles, e.g., $Z_p = 0.1, 0.8$.

Since ABN2 30 cancels only the second lobe of the echo component and the only signal fed to BN filter 32 is the transmit pulse from prefilter 24, BN filter 32 must have a certain delay from input to output, as indicated by FIG. 2D relative to FIG. 2A. This delay substantially aligns the output of BN filter 32 with the output of low pass filter 36. To achieve this delay, a slower clock (320 KHz) and an inverting type of input capacitor clocking are used.

The analog portions of ABN1 28 and ABN2 30 comprise capacitor arrays with selectable capacitors. The selection of capacitors causes the flat frequency gain to change. Those skilled in the art will recognize that any number of capacitor stages could be substituted for the number shown.

Figure 4:
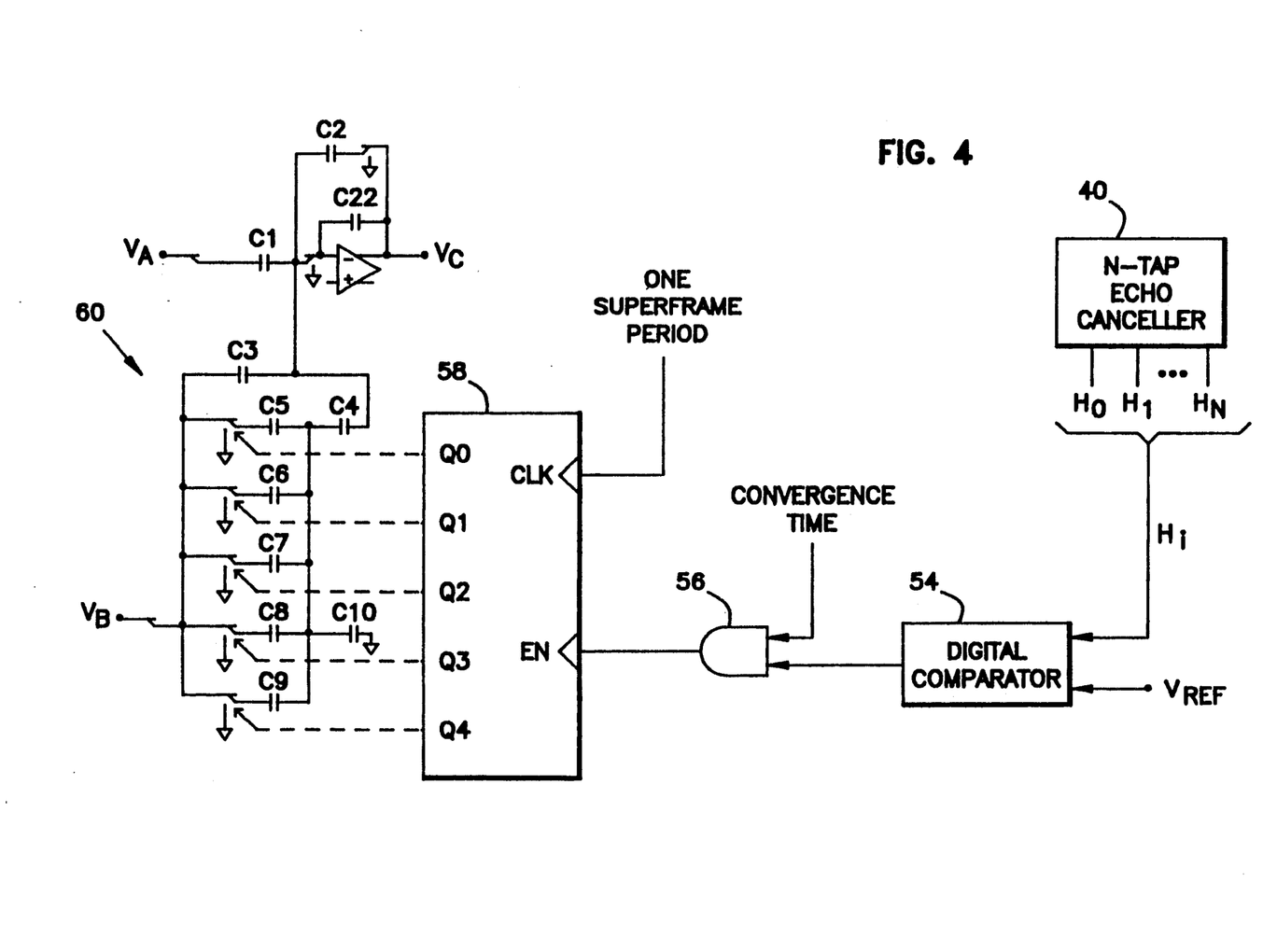
FIG. 4 is a block diagram of the digital control for the adaptive balancing networks of FIG. 1.

FIG. 4 describes generally the digital control for the capacitor arrays of ABN1 28 and ABN2 30. The digital control includes the tap outputs from echo canceller 40, digital comparator 54, AND gate 56, digital counter 58, and capacitor array 60. Although the capacitor array 60 for ABN1 28 is shown in FIG. 4, the digital control for ABN2 30 is substantially similar to the digital control for ABN1 28. However, the digital control will vary according to number of stages present in the capacitor array 60.

The digital control uses one or more selected tap outputs $H_i$ from the transversal filter echo canceller 40 to control the selection of a capacitive load provided by array 60. In the preferred embodiment, ABN1 28 uses the 3rd tap output, i.e., $H_3$, and ABN2 30 uses the 4th tap output, i.e., $H_4$. These tap outputs where chosen by the Applicant after experimentation on actual telephone lines and software simulation. Those skilled in the art will recognize that other tap outputs could be substituted for tap outputs used in the preferred embodiment.

The selected tap output $H_i$ is compared to a selected reference voltage $V_{ref}$ with the result indicated by the output of digital comparator 54. If the selected tap output $H_i$ is greater than the reference voltage $V_{ref}$, then the output of digital comparator 54 is a logical one; otherwise the output of digital comparator 54 is a logical zero. The output of digital comparator 54 is ANDed at gate 56 with a convergence period time signal, which in the preferred embodiment is a logical one for one superframe, i.e., 960 symbols. If the output of AND gate 56 is a logical one, then counter 58 is enabled and counts up by one for every superframe period. Each output of counter 58 turns on at least one corresponding stage in array 60, thereby altering the capacitance.

The change in capacitance in capacitor array 60 with respect to fixed capacitors $C_1$ and $C_2$ causes the flat frequency gain to change. The flat frequency gain is thus adjusted by the selection of capacitors in capacitor array 60. The flat frequency gain can be calculated with respect to nodes $V_A$, $V_B$, and $V_C$ in FIG. 4. For ABN1 28, nodes $V_A$, $V_B$, and $V_C$ correspond to the output from prefilter 26, the output from prefilter 24, and the output of summing node 34, respectively; for ABN2 30, nodes $V_A$, $V_B$, and $V_C$ correspond to the output from low pass filter 36, the output from BN filter 32, and the output of summing node 38, respectively. The response for both ABN1 28 and ABN2 30 can be calculated as:

$$V_C = (\alpha V_A + \beta V_B) F \quad (1)$$

wherein:

$$\alpha = -C_1 \quad (2)$$

$$\beta = C_3 + \frac{(Q_0 C_5 + Q_1 C_6 + Q_2 C_7 + Q_3 C_8 + Q_4 C_9) \times C_4}{C_4 + C_5 + C_6 + C_7 + C_8 + C_9 + C_{10}} \quad (3)$$

$$F = \frac{1}{C_2 + C_{22} - C_{22} \times z^{-1}} \quad (4)$$

The capacitor values represented by $C_5$, $C_6$, $C_7$, $C_8$, and $C_9$ are added into the above equation when the corresponding stages in capacitor array 60 are turned "ON" by the outputs $Q_0$, $Q_1$, $Q_2$, $Q_3$, and $Q_5$ of counter 58. Normally, $C_5 = C_0$, $C_6 = 2C_0$, $C_7 = 4C_0$, $C_8 = 8C_0$, and $C_9 = 16C_0$, so that:

$$\beta = C_3 + \frac{C_4 \sum_{i=0}^{4} Q_i C_0 2^i}{C_4 + C_{10} + 31 C_0} \quad (5)$$

Figure 5:
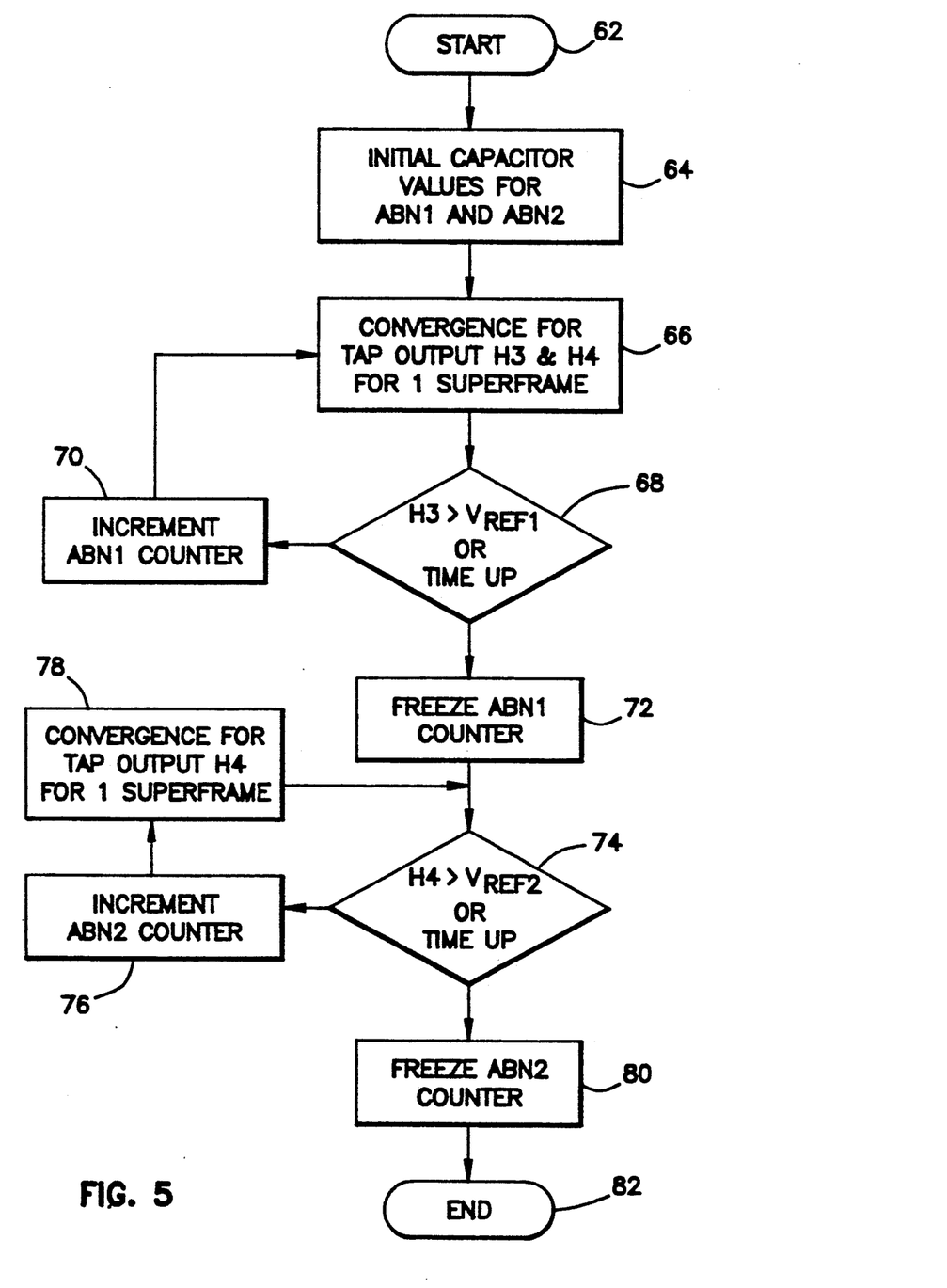
FIG. 5 is a flow chart diagram of the control procedures for the adaptive balancing networks.

FIG. 5 is a flow chart describing the convergence process for ABN1 28 and ABN2 30. Block 62 represents the start of the convergence process. Block 64 represents the initial capacitance values, i.e., the $C_3$ value in Eq. (5) above, provided by capacitor array 60. Block 66 represents the convergence process of the 3rd tap and the 4th tap in echo canceller 40. Block 68 is a decision block wherein control is transferred to block 72 when the 3rd tap output $H_3$ is greater than a reference voltage $V_{ref1}$ or when the convergence time period has expired; otherwise, control is transferred to block 70. Block 70 increments counter 58; block 72 freezes counter 58. Block 74 is a decision block wherein control is transferred to block 80 when the 4th tap output $H_4$ is greater than a reference voltage $V_{ref2}$ or when the convergence time period has expired; otherwise, control is transferred to block 76. Block 76 increments counter 58 and block 78 represents the convergence process of the 4th tap of echo canceller 40; block 80 freezes counter 58. Block 82 ends the procedure.

In summary, the present invention describes an adaptive balancing network apparatus and a method of using that apparatus to achieve improved cancellation of transhybrid response. The adaptive balancing network removes near-end echo much better than the prior art methods over a wide variation of the loop plant, and hence, provides a cost-effective implementation of a transceiver. The present invention comprises two adaptive balancing networks and a balancing network filter that provide increased echo cancellation in the analog domain of up to 25 dB, so that the requirements for A/D and D/A convertors can be relaxed from 13 bits to 10 bits (or less). The first adaptive balancing network removes a first portion of the echo using a transmitted signal. The balancing network filter reshapes the transmitted signal and shifts it in time so that the second adaptive balancing network can cancel a second portion of the echo. Control of the adaptive balancing networks is accomplished by monitoring the coefficients of an echo canceller in the digital domain during an initial convergence time period; thereafter the balancing networks are frozen until their next initialization.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus providing improved cancellation of an echo component caused by a transmitted signal, comprising:

(a) a first adaptive balancing network for creating a first portion of the echo component from the transmitted signal;

(b) a balancing network filter for reshaping the transmitted signal and for shifting the transmitted signal in time;

(c) a second adaptive balancing network, coupled to the balancing network filter, for creating a second portion of the echo component from the reshaped and shifted transmitted signal; and (d) summing means, coupled to the first adaptive balancing network, the balancing network filter and the second adaptive balancing network, for combining the first and second portions of the echo component in a subtractive relationship with a received signal so that the echo component is cancelled therefrom.

2. The apparatus of claim 1, wherein the first adaptive balancing network comprises first control means coupled to the first adaptive balancing network and a transversal filter echo canceller, for monitoring at least one of the tap outputs of the echo canceller and for commanding the first adaptive balancing network to alter a gain of the first portion of the echo component in accordance with the monitored tap output.

3. The apparatus of claim 2, wherein the first adaptive balancing network comprises a capacitor array with a plurality of selectable capacitors, so that the first control means can selectively activate the capacitors to alter a flat frequency gain of the first portion of the echo component.

4. The apparatus of claim 2, wherein the first control means comprise means for monitoring the tap output of the echo canceller during an initial convergence time period.

5. The apparatus of claim 1, wherein the second adaptive balancing network comprises second control means, coupled to the second adaptive balancing network and a transversal filter echo canceller, for monitoring at least one tap output of the echo canceller and for commanding the second adaptive balancing network to alter a gain of the second portion of the echo component in accordance with the monitored tap output.

6. The apparatus of claim 5, wherein the second adaptive balancing network comprises a capacitor array with a plurality of selectable capacitors, so that the second control means can selectively activate the capacitors to alter a flat frequency gain of the second portion of the echo component.

7. The apparatus of claim 5, wherein the second control means comprise means for monitoring the tap output of echo canceller during an initial convergence time period.

8. An adaptive balancing network for improved cancellation of transhybrid response in a received signal over a wide variation of the loop plant, comprising:
  (a) a capacitor array with a plurality of capacitors;
  (b) control means, coupled to the capacitors, for monitoring at least one tap output of an echo canceller and for selectively activating the capacitors to alter a gain for an echo cancellation signal in accordance with the monitored tap output comprising a counter having a plurality of outputs coupled to the capacitors, wherein each of the outputs activates at least one of the capacitors, means for comparing the monitored tap output from the echo canceller to at least one reference value and means for incrementing the counter when the compared tap output exceeds the reference value, so that at least one of the capacitors is activated thereby providing an increased capacitive load to increase the gain of the echo cancellation signal; and
  (c) summing means, coupled to the capacitors, for combining the received signal and th echo cancellation signal in a subtractive relationship so that the transhybrid response is cancelled therefrom.

9. A method of adjusting a gain value provided by an adaptive balancing network for an echo cancellation signal during a convergence time period, so that transhybrid response in a received signal is cancelled when the echo cancellation signal is combined with the received signal in a subtractive relationship, wherein the adaptive balancing network comprises a counter having a plurality of outputs coupled to a plurality of capacitors, each of the outputs activating at least one of the capacitors to alter the gain value, the method comprising:
  (a) initializing th counter to activate one or more of the capacitors to provide an initial gain value;
  (b) incrementing the counter when a reference voltage is greater than a monitored tap output of a transversal echo filter, so that additional capacitors are activated to increase the gain value; and
  (c) repeating step (b) while the reference voltage is greater than the monitored tap output and the convergence time period has not expired.

* * * * *

UNITED STATES PATENT AND TRADEMARK OFFICE
CERTIFICATE OF CORRECTION

PATENT NO. : 5,153,875
DATED      : October 6, 1992
INVENTOR(S) : Hiroshi Takatori It is certified that error appears in the above-identified patent and that said Letters Patent is hereby corrected as shown below:

Column 1, line 54, after "transmission" and before "he" insert a comma --,--. Column 2, line 17, "T." should read --T1--. Column 3, line 20, "gage" should read --gauge--. Column 5, line 31, after "portion", "o" should read --of--; line 46, "form" should read --from--; line 48, "again" should read --a gain--; line 60, after "described" insert --in--. Column 6, line 9, after "described" insert --in--. Column 9, line 20, "comprise" should read --comprises--; line 41, "comprise" should read --comprises--. Column 10, line 35, after "initializing", "th" should read --the--.

Signed and Sealed this

Twenty-sixth Day of October, 1993

Attest:

BRUCE LEHMAN

*Attesting Officer*    *Commissioner of Patents and Trademarks*